May 9, 1939.  W. LA HODNY  2,157,613
REAR VIEW MIRROR
Original Filed Dec. 4, 1933
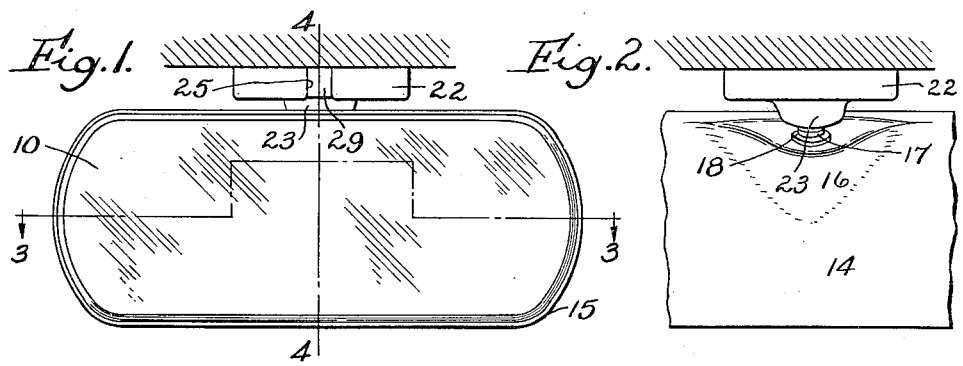
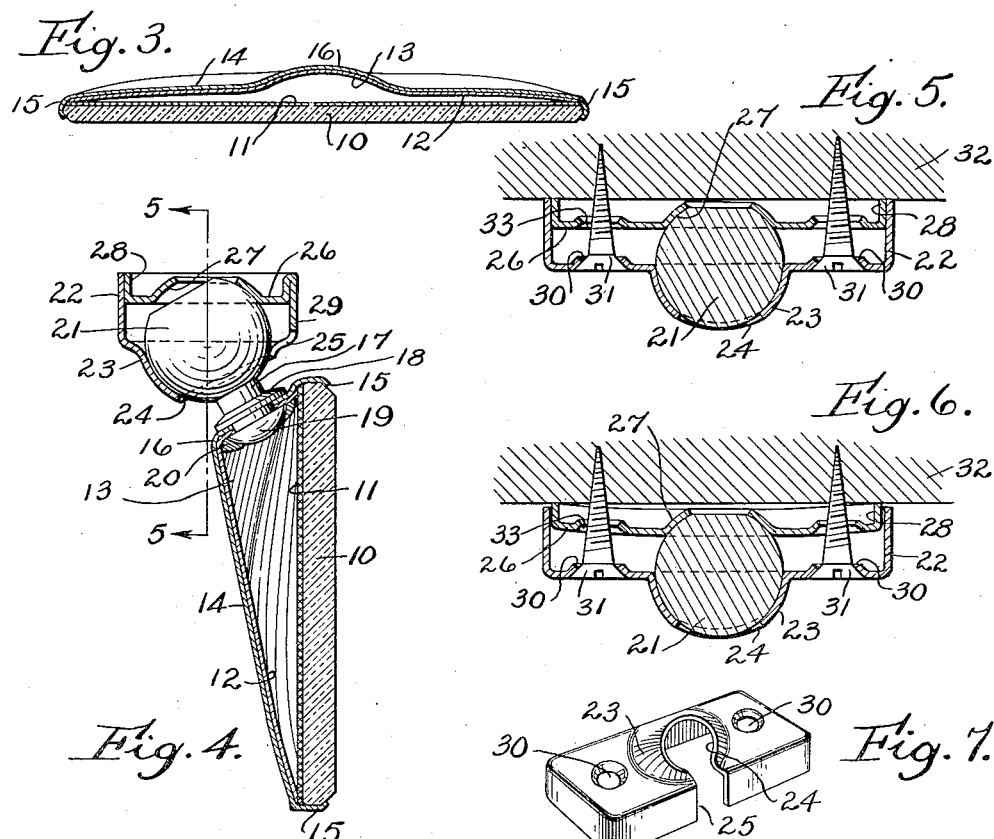
INVENTOR
William La Hodny
by Parker, Rockwood & Farmer
ATTORNEYS Patented May 9, 1939

2,157,613

UNITED STATES PATENT OFFICE 2,157,613

REAR VIEW MIRROR

William La Hodny, Buffalo, N. Y.

Original application December 4, 1933, Serial No. 700,806, now Patent No. 2,071,883, dated February 23, 1937. Divided and this application November 21, 1936, Serial No. 112,095

8 Claims. (Cl. 287—21)

This invention relates to rear view mirrors or the like, and particularly to the means by which the reflecting plate is supported and adjusted into different angular positions. This application is a division of my copending application Ser. No. 700,806 filed December 4, 1933, now Patent No. 2,071,883 of Feb. 23, 1937.

An object of the invention is to provide an improved and attractive rear view mirror in which the supporting means projects to a minimum extent from the rear of the mirror plate, with which a limited universal adjustment of the mirror plate is permitted, with which the mirror plate is held in any of different adjusted positions by simple, durable, compact and inexpensive means, and with which the friction holding the mirror plate against movement will be resilient and continuing to compensate for wear.

Various other objects and advantages will be apparent from the following description of an embodiment of the invention, and the novel features will be particularly pointed out hereinafter in connection with the appended claims.

In the accompanying drawing:

Fig. 1 is a front elevation of a rear view mirror constructed and supported in accordance with this invention;

Fig. 2 is a rear elevation of the same;

Fig. 3 is a sectional plan of the same, the section being taken approximately along the line 3—3 of Fig. 1;

Fig. 4 is a transverse, sectional elevation of the same, the section being taken approximately along the line 4—4 of Fig. 1;

Fig. 5 is a sectional elevation through a portion of the supporting means, the section being taken approximately along the line 5—5 of Fig. 4, the parts being shown in the relative positions occupied when fully attached to a supporting object, such as a vehicle body, and with the head frictionally and resiliently clamped;

Fig. 6 is a sectional elevation similar to Fig. 5, but illustrating the relative positions of the parts just before the device is fully attached to the vehicle frame or body, and before the resilient pressure is placed upon the ball-like head of the stud which supports the mirror plate; and Figs. 7 and 8 are perspectives of the parts which receive and mount the ball-like head of the stud that projects from the reflecting unit, with the parts shown in these figures inverted and separated from one another but in positions ready to be assembled, after the head is placed in the seat of the cup-like shell shown in Fig. 7.

In the illustrated embodiment of the invention, the improved device includes a mirror or reflecting plate 10, which, if of glass or other transparent material, will have a reflecting coating upon one face thereof. A pad or sheet 11 of cardboard, paper, or other sheet elastic material, is disposed flat against the face of the mirror plate 10 which has the reflecting coating thereon, and this pad or sheet 11 is coextensive with the coated face of the plate. A reinforcing plate 12 is disposed against the pad or sheet 11 and is approximately coextensive therewith. This plate 12 is of relatively stiff material, such as relatively heavy sheet, brass, steel or other metal, and it may be made somewhat convex, with the concave side abutting the pad or sheet 11. A boss 13 is drawn outwardly from the plate 12 adjacent its upper margin, and the bottom or end face of this boss is relatively flat and acutely inclined to the coated or reflecting face of the mirror plate 10.

A backing member 14, of thinner and flexible metal, is fitted face to face against the outer face of the reinforcing plate 12, including the boss 13 thereof, and the marginal portions 15 of this backing member 14 extend beyond the corresponding margin edges of the reinforcing plate 12 and are flanged over the peripheral or marginal edges of the mirror plate 10. The marginal edges of the plate 10 may be beveled in any suitable manner to facilitate the flanging of the marginal portions 15 of the member 14 over the plate 10, so as to clamp the plate 10 firmly to the reinforcing plate 12. The backing member, therefore, has a boss 16 drawn therefrom which nests with and fits the boss 13 of the reinforcing plate 12.

A stud 17 has a flange 18, intermediate of its ends, which abuts against the flat end wall or face of the nesting bosses 13 and 16, as shown in Fig. 4, and the shank of the stud then extends through aligned apertures in the flat end walls of the bosses 13 and 16. The inner end of the stud is then upset to provide a head 19 which rivets or clamps the stud to the flat ends of the bosses 13 and 16. The upset end 19 is also preferably connected to the reinforcing plate 12 by a readily fusible metal body 20, such as by solder or welding metal which unites the upset end 19 integrally to the plate 12 under the action of heat. The stud 17 is, of course, applied to the plate 12 and backing member 14 before this plate and member are applied to the mirror plate 10.

The stud 17 extends upwardly and rearwardly at an acute inclination to the mirror plate 10, and terminates in a ball-like head 21. A cup-like shell 22 of drawn sheet metal and of generally rectangular shape, is provided in its end or bottom wall with an outwardly drawn boss 23 having an aperture 24 therein so as to provide a downwardly arcuate seat which resembles a section of a spherical surface. The aperture 24 in the seat of the boss 23 is connected with an edge of the shell 22 at its open face by a slot 25 which preferably has a width less than the diameter of the aperture 24 and through which the shank of the stud 17 may pass. By passing the shank of the stud 17 through the slot 25 of the shell 22, the head 21 may be disposed within the cavity or chamber of the cup-like shell 22 and with the shank of the stud extending outwardly through the aperture 24. The head 21 rests in and fits the seat formed in the boss 23.

A closure plate 26, also of generally rectangular or elongated shape, is provided for, and telescopes into, the open end or face of the shell 22. This closure 26 is provided centrally with a drawn boss 27 which is aligned with the boss 23 when the closure is in telescopic position in the open face of the shell 22, and this boss 27 extends upwardly or away from the boss 23 when assembled in telescopic manner as shown clearly in Figs. 4 to 6. This boss 23 may be made in the shape of a segment of a spherical surface so as to provide a concave seat which engages the seat 21 of the stud 17 and confines it to the seat in the boss 23.

The closure 26 may have marginal flanges 28 to increase its stiffness or rigidity, and prevent it from binding in the shell 22. A tongue 29 extends from the free edge of one of the marginal flanges of this closure and is bent back upon itself to enter and close the slot 25 in the shell 22, as shown clearly in Figs. 1 and 4. When the closure is in telescopic position in the open face of the shell 22, the tongue 29 fills in the slot 25 along the side wall of the shell 22 so as to present a smooth and finished appearance to the shell 22. The flanges 28 extend in a direction upwardly or outwardly of the shell 22, and the closure is given a slight camber in an endwise direction, as shown in Fig. 6, so that the ends of the closure extend slightly outwardly from the open face of the shell 22 when the seat boss 27 of the closure is confining the head 21 of the stud snugly to the seat of the boss 23, as shown in Fig. 6.

The end portions of the shell 22, at opposite sides of the boss 23, are provided with apertures 30 which when formed are flanged or drawn inwardly slightly so as to provide counter sunk seats which receive the heads of flat headed screws 31 or other suitable securing means that pass through the apertures 30 and into a suitable supporting object 32, such as a vehicle body or frame. The closure 26 is also provided with similarly formed apertures 33 through which the screws 31 loosely pass and for this purpose the apertures 33 are aligned with the apertures 30 when the closure is telescoped within the shell 22.

After the shell 22 and closure 26 are assembled, as shown in Fig. 6, a further tightening of the screws 31 will draw the shell 22 tightly against the supporting object 32, and in doing so the ends of the closure 26 will be sprung into the chamber or cavity of the shell 22, which flexes the closure 26 in a transverse direction at points between its ends and on each side of the head 21, so as to produce a resilient frictional pressure on the head 21. This frictional resilient pressure on the head 21 serves to hold the head 21 in different rockable positions into which it may be moved, and will continue even after considerable wear has occurred between the head and the seats in which it is confined. When the shell 22 is drawn tightly against the supporting object 32, in order to produce this resilient pressure on the head 21, the parts assume the relative positions shown in Fig. 5 of the drawing.

When the stud 17 extends at an acute inclination to the mirror plate 10, as shown in the drawing, the aperture 24 in the seat of the boss 23 of the shell 22 should usually be somewhat off center, so that when the shell 22 is secured against a horizontal surface of the object 32, as shown in the drawing, the mirror plate 10 will be supported in an approximately vertical position, and yet can be shifted or rocked universally to a considerable extent as permitted by the aperture 24.

The use of the mirror, which has been constructed in accordance with this invention, would appear to be obvious from the foregoing description. It will be noted that the device is particularly compact and occupies a minimum of space from front to rear and vertically, yet it has all the advantages of a universal support for a mirror plate, and the friction holding the mirror plate in any adjusted position will be maintained for a long period of time to compensate for wear. The device is free of objectionable projections, is light in weight, attractive in appearance, and simple and inexpensive. The manner in which the stud is anchored to the parts that embrace the mirror plate is simple, and rigid, and deformation of the sheet metal members which mount the plate 10 will be effectively resisted.

It will be understood that various changes in the details and materials, which have been herein described and illustrated in order to explain the nature of the invention, may be made by those skilled in the art within the principle and scope of the invention as expressed in the appended claims.

I claim as my invention:

1. In combination in a bracket structure, a post, a ball at one end of the post, a casing open at the top provided with a socket carrying said ball, a support, a clamping plate carried by the casing above the ball and having flanges at right angles to the body of the plate guided by the side wall of the casing and normally projecting above the upper edge of the casing, and screw means extending through the casing and clamping plate and into the support for drawing the casing toward the support and clamping the ball between the socket and clamping plate.

2. In combination, in a bracket structure, a post, a ball at one end of the post, a casing member open at the top and provided with a socket carrying said ball, a support, a spring clamping plate having upturned flanges at its edge, with the end flanges normally above the upper edge of the casing, and screw means for drawing the casing against the support and clamping the ball between the socket and clamping plate.

3. In combination in a bracket structure, a post, a ball at one end of the post, a casing member provided with a socket carrying said ball, a support, a spring clamping plate in the casing above the ball having its ends upturned so that they normally lie above the upper edge of the casing, and screw means extending through the casing and plate and into the support for drawing the casing toward the support and clamping the ball between the socket and clamping plate.

4. In a rear view mirror or the like, a supporting stud terminating in a ball-like head, a cup-like shell having a partially spherical seat drawn outwardly from a wall of said shell and having a slot extending into said seat from an edge of said shell, whereby the shank of said stud may pass through said slot and said head may enter said seat, a closure for said shell received in and reinforcing the open face thereof, said closure having a partially spherical seat drawn outwardly therefrom and facing the seat in said cup-shaped shell, so as to engage said head and confine it to said first mentioned seat, said closure having a portion projecting outwardly from the open face of said shell when said head is clamped between said seats, and means for drawing said shell against a supporting object with the open face of said shell abutting against said object, whereby as said shell is drawn against that supporting object, said closure will be forced further into the open face of said shell to create greater pressure on said head.

5. In a rear view mirror or the like, a supporting stud terminating in a ball-like head, a cup-like shell having a partially spherical seat drawn outwardly from a wall of said shell and having a slot extending into said seat from an edge of said shell, whereby the shank of said stud may pass through said slot and said head may enter said seat, a closure for said shell telescoping with the open face thereof, said closure having a partially spherical seat drawn outwardly therefrom and facing the seat in said cup-shaped shell so as to engage said head and confine it to said first mentioned seat, said closure having portions remote from its seat projecting outwardly from the open face of said shell when said closure abuts said head, and means for drawing said shell against a supporting object with the open face of said shell abutting said object so as to force the said projecting remote portions of said closure further into the open face of said shell and produce a resilient pressure on said head which is clamped between said seats.

6. In a rear view mirror or the like, a supporting stud terminating in a ball-like head, a cup-like shell having a partially spherical seat drawn outwardly from a wall of said shell and having a slot extending into said seat from an edge of said shell, whereby the shank of said stud may pass through said slot and said head may enter said seat, a closure for said shell telescoping with the open face thereof, said closure having a partially spherical seat drawn outwardly therefrom and facing the seat in said cup-shaped shell so as to engage said head and confine it to said first mentioned seat, said shell and its closure having aligned apertures at opposite sides of said seats, and securing means passing through said apertures for anchoring said shell to a supporting object with the open face of said shell abutting flat against said object, said closure having portions remote from its seat projecting outwardly of the open face of said shell when the seat of said closure engages said head, so that when said shell is drawn against a face of a supporting object, said projecting portions of the closure will be sprung further into said shell and will produce a resilient pressure on said head.

7. In a rear view mirror or the like, a supporting stud terminating at its free end in a ball-like head, a cup-shaped, sheet metal shell having a concave boss drawn outwardly from the bottom wall and said boss having therein an aperture larger than said stud and smaller than said head, but whose plane is inclined to said wall, said shell having a slot connecting an edge thereof with said aperture, whereby said stud may pass through said slot into said aperture as said head enters the boss in said cup, and a detachable member in said cup for confining said head in said boss and frictionally holding said stud in different angular positions with respect to said boss, said member having a tongue entering said slot to prevent unintentional escape of said stud from said boss.

8. In a rear view mirror or the like, a stud terminating in a ball-like head, a cup-like shell having a partially spherical seat drawn outwardly from a wall of said shell and having a slot extending into said seat from an edge of said shell, whereby the shank of said stud may pass through said slot and said head may enter said seat, a closure for said shell telescoping with the open face thereof, said closure confining said head to said seat and having a tongue portion thereof fitting into, filling and closing said slot from its outer end approximately to said seat, and means for variably urging said closure toward said seat, to frictionally hold said stud in different angular positions with respect to said shell.

WILLIAM LA HODNY.